May 19, 1931.  H. G. WEINLAND  1,805,896
GRINDING WHEEL TESTING APPARATUS
Filed March 21, 1928
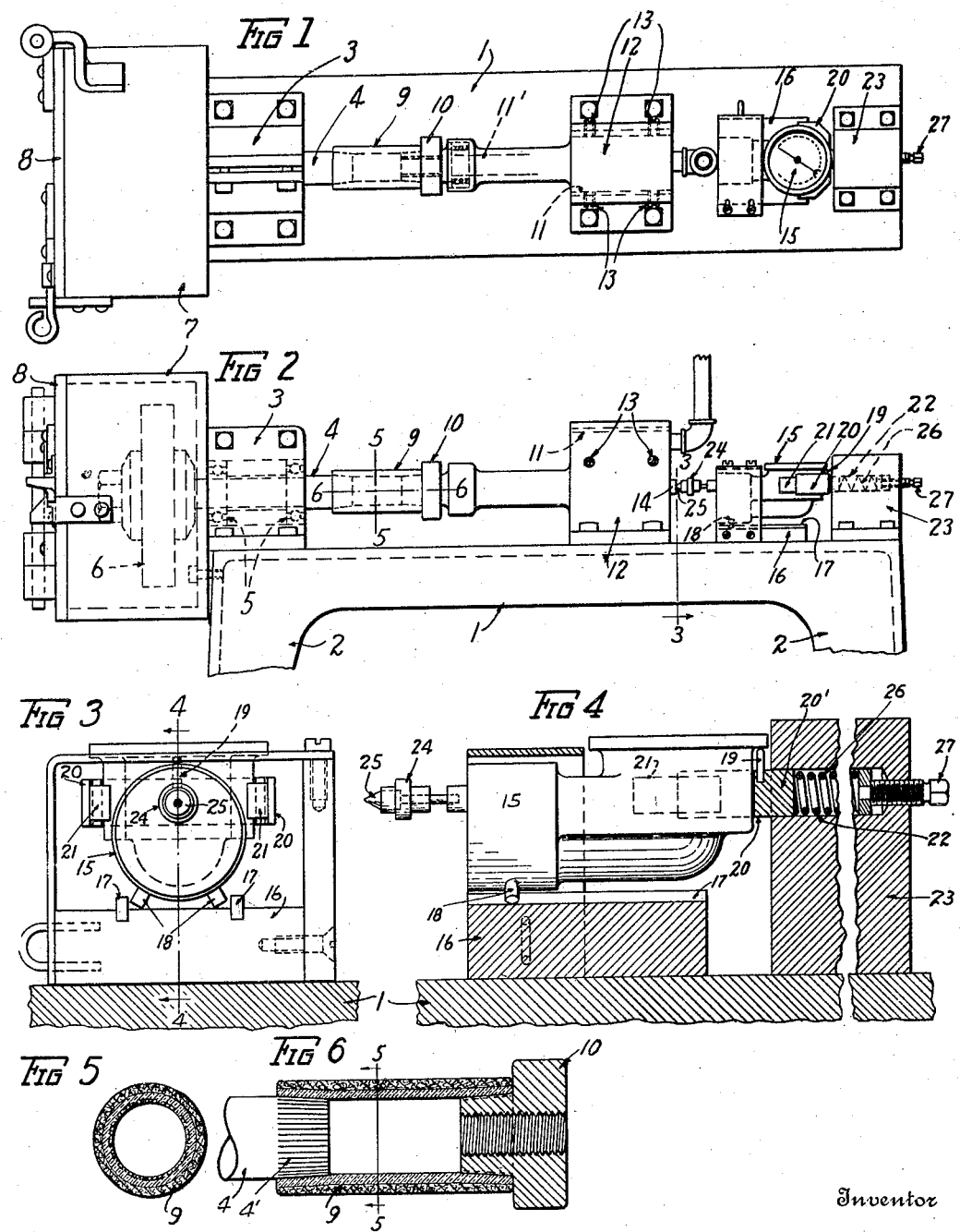
Inventor
Hermon G. Weinland
By Staley & Welch
Attorneys Patented May 19, 1931

1,805,896

UNITED STATES PATENT OFFICE

HERMON G. WEINLAND, OF SPRINGFIELD, OHIO, ASSIGNOR TO THE SAFETY GRINDING WHEEL & MCH. COMPANY, OF SPRINGFIELD, OHIO, A CORPORATION OF OHIO

GRINDING WHEEL TESTING APPARATUS

Application filed March 21, 1928. Serial No. 263,484.

This invention relates to testing apparatus for testing grinding wheels, and it relates particularly to apparatus in which the articles under test are to be rotated at known speeds to determine the strength of the wheels, and especially to apparatus capable of very high speeds.

In testing wheels in this manner it is the practice to rotate the wheels at a speed considerably greater than the maximum speed which the wheel will encounter in actual use, as a result of which imperfect wheels burst, resulting in severe strain and shock to the parts which carry and surround the grinding wheel which, unless provision is made to avoid it, is transmitted to the motor and other parts of the apparatus.

Further, in testing grinding wheels of the smaller size for which this apparatus is particularly intended, it is necessary to use a light weight motor capable of running at high speeds so that the danger of breakage due to the strain and shock of the bursting of the wheels is correspondingly increased. Also, the use of a light weight motor necessitates the elimination of complicated driving connections, such as gears or belting, between the motor and the grinding wheel spindle and between the motor and the instrument that registers the speed of revolutions to reduce friction as far as possible so that the bulk of the power of the motor can be employed for rotating the wheel.

One of the objects of the invention is to provide means for so mounting the motor and the unit that carries the grinding wheel and so rotatably connecting them together that the shock occasioned by the bursting of the wheel will not be transmitted to the motor.

A further object of the invention is to so connect the motor with the grinding wheel spindle and with the speed indicating instrument as to minimize the power required to drive the instrument and wheel whereby the bulk of the power of the motor may be utilized to rotate the wheel at a high speed.

In the accompanying drawings:
Fig. 1 is a plan view.
Fig. 2 is a front elevation.
Fig. 3 is an enlarged section on the line 3—3 of Fig. 2.
Fig. 4 is a section on the line 4—4 of Fig. 3.
Fig. 5 is a section on the line 5—5 of Fig. 2.
Fig. 6 is a section on the line 6—6 of Fig. 2.

In the drawings, 1 is a substantial bed-plate or main frame supported on legs 2, 2. A housing 3 in which a spindle 4 is mounted, preferably in anti-friction bearings 5, is secured to the bed-plate. The grinding wheel 6 is placed on the spindle and secured in the ordinary manner by a nut and collar. A shield in the form of a casing 7 having a door 8 encloses this end of the spindle and is secured to the bed-plate.

The other end of the spindle 4 is knurled, as at 4', to prevent slippage in ordinary operation, and on this end is forced a length of hose 9, the other end of which is engaged with a similarly knurled member 10, which, in effect, is a continuation of a motor shaft 11' of a light air motor 11. The shaft 11' is mounted in an extension 11'' of the motor housing 12, and has its end threaded in the member 10. The motor is held in the housing 12, and adjusted for lateral alignment by screws 13; its shaft having an extension 14 in which there is a cup-center.

A revolution counter 15, in this instance a tachometer of a well known hand type, is supported in alignment with the motor by means of a block 16, fastened to the bed, inserted in which are two parallel strips 17, 17, the tachometer being aligned by these strips in connection with legs 18, 18, fitted into the tachometer body. Further support is provided by a pin 19 set in a yoke, the arms 20 of which have thin leaf-springs 21, 21, inserted in slots in the ends of the yoke arm which embrace the sides of the body of the tachometer. The shank or stem 20' of the yoke is slidably mounted in a bore 22 in a block 23, also in alignment with the motor and fastened to the bad.

The driven end 24 of the tachometer spindle is provided with the usual resilient member 25, adapted to be pressed into and held in frictional engagement with the shaft of the motor, it being inserted in the cup-center provided for that purpose, and is held therein by the action of the coil spring 26, in connection with the adjusting screw 27.

By this arrangement it will be seen that the mounting and shield for the grinding wheel and the motor are constructed as separate units, the shafts of which are flexibly connected together so that any shock or strain occasioned by bursting of the grinding wheel will not be transmitted to the motor, as the comparatively heavy table upon which these parts are mounted is capable of absorbing any such shocks or strains. Further, by the employment of a comparatively light tachometer, the spindle of which is directly connected with the motor shaft, very little power is required to operate the instrument, which, in addition to the fact that all belts, gearing or other similar driving devices between the motor and grinding wheel shafts are eliminated, friction is so reduced that the light motor is enabled to drive the grinding wheel at the high speeds required. Further, the employment of an air motor enables me to secure very wide variations of rotative speed so as to accommodate different diameters of wheels being tested at the same peripheral speed and eliminate belts, gearing and the like, as a light form of air motor is capable of high speeds not possible with an electric motor or other motor and it is not feasible to employ an electric motor or other motor for the purpose without the use of change of speed driving connections.

Having thus described my invention, I claim:

1. In a testing machine for grinding wheels, a grinding wheel mounting including a shaft for the wheel, an air motor having a shaft aligned with said wheel shaft, a flexible connection between said shafts, a speed indicating instrument having a shaft aligned with said motor shaft, and spring means for holding the same in uniform frictional engagement with said motor shaft.

2. In a testing machine for grinding wheels, a grinding wheel mounting including a shaft for the wheel, an air motor having a shaft aligned with said wheel shaft, a flexible connection between said shafts, a speed indicating instrument having a shaft aligned with said motor shaft, spring means for holding the same in uniform frictional engagement with said motor shaft, and means for loosely mounting the instrument to permit its shaft to be properly aligned with said motor shaft.

3. In a testing machine for grinding wheels, a grinding wheel mounting including a shaft for the wheel, a high speed motor having a shaft aligned with said wheel shaft, a flexible connection between said shafts, a speed indicating instrument having a shaft aligned with said motor shaft, slidably mounted legs for supporting one part of said instrument, a slidably mounted spring clamp for supporting another part of said instrument, said clamp having a shank, a support in which said shank is slidably mounted, and an adjustable spring carried by said support bearing upon the end of said shank to hold said instrument shaft in frictional driving relation with said motor shaft.

In testimony whereof, I have hereunto set my hand this 19th day of March, 1928.

HERMON G. WEINLAND.